US008248294B2

(12) United States Patent
Sampigethaya et al.

(10) Patent No.: US 8,248,294 B2
(45) Date of Patent: Aug. 21, 2012

(54) METHOD FOR PROTECTING LOCATION PRIVACY OF AIR TRAFFIC COMMUNICATIONS

(75) Inventors: Radhakrishna G. Sampigethaya, Bellevue, WA (US); Radha Poovendran, Seattle, WA (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 12/759,271

(22) Filed: Apr. 13, 2010

(65) Prior Publication Data

US 2011/0248878 A1 Oct. 13, 2011

(51) Int. Cl.
*G01S 13/87* (2006.01)

(52) U.S. Cl. ................ 342/36; 342/37; 342/32; 342/46; 342/57; 701/120

(58) Field of Classification Search .............. 342/29–32, 342/36–40, 42–46, 57; 701/120
See application file for complete search history.

(56) References Cited

U.S. PATENT DOCUMENTS

| | | | | |
|---|---|---|---|---|
| 6,967,616 | B2 * | 11/2005 | Etnyre | 342/182 |
| 7,027,808 | B2 * | 4/2006 | Wesby | 455/419 |
| 7,755,532 | B2 * | 7/2010 | Dooley | 342/36 |
| 7,876,259 | B2 * | 1/2011 | Schuchman | 342/37 |
| 7,889,115 | B2 * | 2/2011 | Clingman et al. | 342/42 |
| 2005/0200501 | A1 * | 9/2005 | Smith | 340/963 |
| 2007/0132638 | A1 * | 6/2007 | Frazier et al. | 342/455 |
| 2008/0036659 | A1 * | 2/2008 | Smith et al. | 342/454 |
| 2009/0322589 | A1 * | 12/2009 | Dooley | 342/37 |
| 2010/0194622 | A1 * | 8/2010 | Clingman et al. | 342/37 |
| 2010/0198490 | A1 * | 8/2010 | Breen et al. | 701/120 |
| 2010/0315281 | A1 * | 12/2010 | Askelson et al. | 342/30 |
| 2011/0057830 | A1 * | 3/2011 | Sampigethaya et al. | 342/36 |
| 2011/0248878 | A1 * | 10/2011 | Sampigethaya et al. | 342/36 |

FOREIGN PATENT DOCUMENTS

EP 524099 A1 * 1/1993

OTHER PUBLICATIONS

Sampigethaya, R. Privacy of Future Air Traffic Management Broadcasts, 28th Digital Avionics Systems Conference, Oct. 25-29, 2009.
Beresford, A.R., Location Privacy in Pervasive Computing, IEEE Pervasive Computing, 2003, vol. 2, No. 1, pp. 46-55.
Sampigethaya, K., Amoeba: Robust Location Privacy Scheme for VANET, IEEE Journal on Selected Areas in Communications, 2007, vol. 25, No. 8, pp. 1569-1589.

* cited by examiner

*Primary Examiner* — John B Sotomayor
(74) *Attorney, Agent, or Firm* — McNees Wallace & Nurick LLC

(57) ABSTRACT

Methods of protecting location privacy of air traffic communications from unauthorized monitoring of aircraft locations in an uncontrolled airspace include designating a bounded region of uncontrolled airspace; ceasing transmission of a traffic beacon by each aircraft of a plurality of aircraft upon the aircraft entering the bounded region; and updating a unique identifier associated with each of the aircraft while the aircraft is traversing the bounded region.

20 Claims, 6 Drawing Sheets

METHOD FOR PROTECTING LOCATION PRIVACY OF AIR TRAFFIC COMMUNICATIONS

FIELD

This disclosure relates to air traffic communications security. More particularly, the disclosure relates to a system and method to mitigate unauthorized location tracking of an aircraft based on air traffic communications from the aircraft.

BACKGROUND

Air transportation systems with e-enabled aircraft and networked technologies, such as Automated Dependent Surveillance Broadcast (ADS-B), are data communications systems developed to assist in reducing traffic congestion and air traffic control inefficiencies by enabling exchange of precise surveillance data in shared airspace. e-Enabled aircraft means an aircraft with advanced computing, sensing, control, and communications. An e-Enabled aircraft is capable of communicating in a global information network, e.g., as a network node. In broadcasting air traffic beacons in an ADS-B protocol or format, an aircraft discloses an authentic digital identity as well as a highly accurate position and spatial information, e.g., velocity, intent, and other data associated with the aircraft. ADS-B communications are broadcast periodically in traffic beacons, e.g., one or two times per second. ADS-B broadcast traffic beacons can perform traffic control tasks while ensuring liability or traceability of the associated aircraft in the shared networked airspace. Periodic traffic beacons may be detected by unauthorized entities over a range of up to 100 miles or more from the source of ADS-B broadcasts. Thus traffic beacons may be received by unauthorized entities, e.g., an adversary, and used to obtain unique identifiers of communicating aircraft as well as record position trajectories of uniquely identifiable aircraft.

In the airborne IP network, a major privacy threat is from the location estimation of communicating aircraft based on their radio signal properties. Location tracking can invade aircraft operator privacy in unanticipated ways, since private aircraft may be used to visit places of political, business or personal interest. Location trajectories of a private aircraft, when correlated with other information databases such as geographic maps and business or political developments, can help in the identification of places visited by the aircraft as well as inference of travel intent of the user. Furthermore, location history of an aircraft over time can lead to profiling of the user's personal preferences and interests.

The default identifier in an ADS-B broadcast from an aircraft may be, e.g., a permanent 24-bit address of the aircraft as defined by the ICAO (International Civil Aviation Organization). An aircraft in an uncontrolled airspace, operating under visual flight rules (VFR), or instrument flight rules (IFR) may use an anonymous identifier in ADS-B broadcast. An aircraft flight control system may compute a random identifier to generate a 24-bit anonymous identifier for an aircraft. The aircraft flight control system computes the anonymous identifier as a function of a random quantity, e.g., a location or a time of use of anonymous identifier, or a combination thereof, and the ICAO identifier. Air traffic controllers on the ground know the ICAO address of the aircraft and can verify ADS-B broadcasts from the aircraft, e.g., to establish liability in airspace for emergency events.

Privacy-enhancing technologies which provide confidentiality, such as cryptographic encryption, can also mitigate privacy risks by controlling access to sensitive or personal data in aircraft messages. Such solutions require a cryptographic key to be shared between each aircraft and all the air traffic controllers on the ground.

There is a need for mitigating location tracking based on ADS-B messages from aircraft, rather than existing solutions which focus on anonymity of ADS-B messages. There is also a need to consider the presence of unauthorized or external entities that may passively eavesdrop on air traffic communications and track the source of communications.

SUMMARY

The following embodiments and aspects thereof are described and illustrated in conjunction with systems and methods that are meant to be exemplary and illustrative, not limiting in scope. In various embodiments, one or more of the limitations described above in the Background have been reduced or eliminated, while other embodiments are directed to other improvements.

A first embodiment of the disclosure includes a method of protecting location privacy of air traffic communications from unauthorized monitoring of aircraft locations in an uncontrolled airspace. The method includes designating a bounded region of uncontrolled airspace; ceasing transmission of a traffic beacon by each aircraft of a plurality of aircraft upon the aircraft entering the bounded region; and updating a unique identifier associated with each of the aircraft while the aircraft is traversing the bounded region.

A second embodiment of the disclosure includes a method for mitigating location tracking and enhancing aircraft location privacy. The method includes ceasing transmission of traffic beacons by each aircraft of a plurality of aircraft at a random time and place, and for a random time period and updating a unique identifier associated with each of the aircraft while the aircraft is silent, i.e., not transmitting during the random time period. Each aircraft in the plurality of aircraft is configured to compute a random time period for which to cease transmission of traffic beacons.

A third embodiment discloses a system for mitigating of location tracking and enhancing aircraft location privacy. The system includes a plurality of aircraft navigating as a cooperating group. Each aircraft is geographically proximate to the remaining aircraft in the group and each aircraft is travelling at approximately the same average velocity and in a generally similar direction. Each aircraft includes an ADS-B type air traffic communication system. Each aircraft is configured to select a group leader aircraft from the cooperating group of aircraft; reduce a transmission range of an associated air traffic beacon by each of the remaining aircraft of the cooperating group, the reduced transmission range sufficient for each of the aircraft to communicate with the group leader as well as with other members of the group; and provide location information for all aircraft of the cooperating group to the group leader as well as to each other. The group leader aircraft is configured to receive an air traffic beacon from each of the remaining aircraft of the cooperating group and to communicate its own air traffic beacon with airborne and ground station equipment located outside the group.

One advantage of the present disclosure is a solution to the problem of protecting location privacy of operators of e-Enabled aircraft.

Another advantage of the present disclosure is to provide distributed solutions that can potentially allow a target aircraft to enhance its location privacy level at each anonymous identifier update to mitigate unauthorized determination of the trajectory.

Further aspects of the method and apparatus are disclosed herein. Other features and advantages of the present disclosure will be apparent from the following more detailed description of the preferred embodiment, taken in conjunction with the accompanying drawings that illustrate, by way of example, the principles of the disclosure.

DETAILED DESCRIPTION

The present disclosure now will be described more fully hereinafter with reference to the accompanying drawing, in which a preferred embodiment of the disclosure is shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

The present disclosure provides methods for protecting location privacy of operators of e-Enabled private aircraft. The methods take into account the potential for unauthorized entities, i.e., those entities that are outside of the air traffic control system, to eavesdrop on communications from aircraft and derive information that the aircraft operators wish to maintain private. The methods disclosed include the use of group navigation property of aircraft, i.e., aircraft moving in a similar direction with similar velocity forming a group of nodes.

In one embodiment, the present disclosure provides distributed solutions that can potentially allow a target aircraft to enhance its location privacy level at each anonymous identifier update. An aircraft's flight position at any time is a function of various factors such as the atmospheric conditions, the flight levels of other aircraft in the area, the distance of the flight, the current stage of the flight, e.g., ascent, cruise, or descent, and the aircraft's optimal flight level. Privacy may be an additional factor in choosing aircraft position. Based on privacy level desired by an aircraft in an uncontrolled airspace during a specific period, and the other factors listed above, the aircraft may select a 3-D position trajectory.

The methods described below increase the uncertainty for the unauthorized entities to link an anonymous identifier with a permanent aircraft identifier, by introducing in the identifier update (i) spatial uncertainty or (ii) both spatial and temporal uncertainty.

Figure 1:
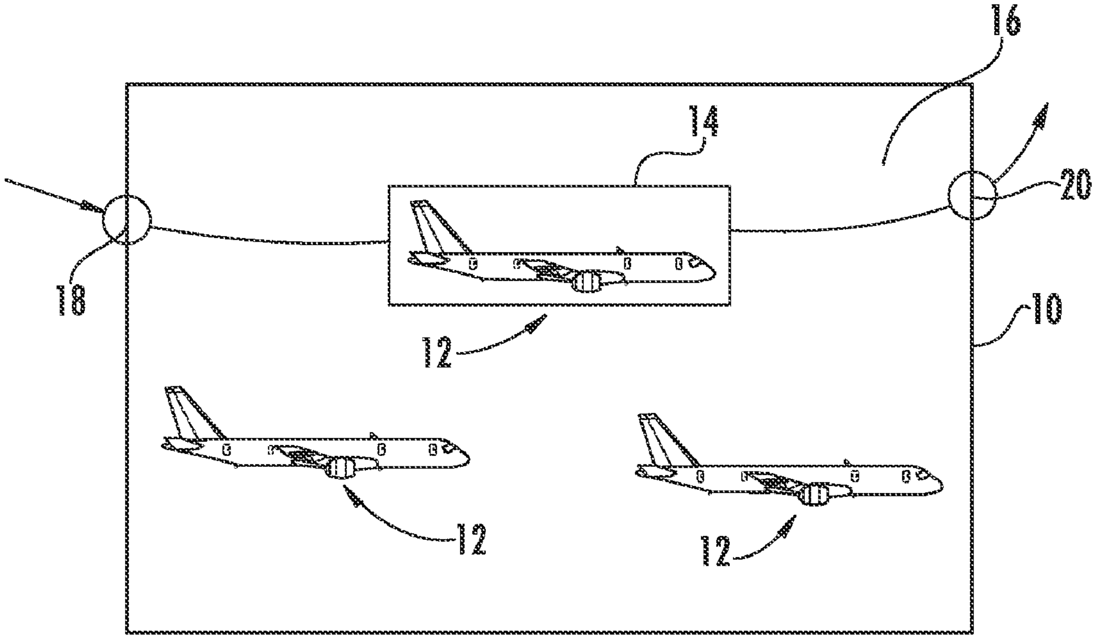
FIG. 1 illustrates an exemplary embodiment of a bounded region of uncontrolled airspace in which multiple aircraft are navigating without wireless transmission.

Referring to FIG. 1, certain bounded regions 10 in which there are multiple aircraft 12 travelling may be designated in an uncontrolled airspace 16. In the bounded region 10, aircraft 12 do not transmit traffic beacons, but update their identifier. As a result, for a target aircraft 14 traversing a designated region 10, the point of entry 18 of the bounded region by the target aircraft 14 may be untraceable by an unauthorized entity to the exit point 20 of the bounded region 10 by the target aircraft 14, provided there are two or more aircraft 12 simultaneously in the same airspace 16. The designated regions 10 function more effectively when there is not a high degree of temporal and spatial correlation between aircraft locations, since time and 3-D exit point that each aircraft would exit the bounded region is less predictable for an entity attempting to track one or more of the aircraft.

Figure 2:
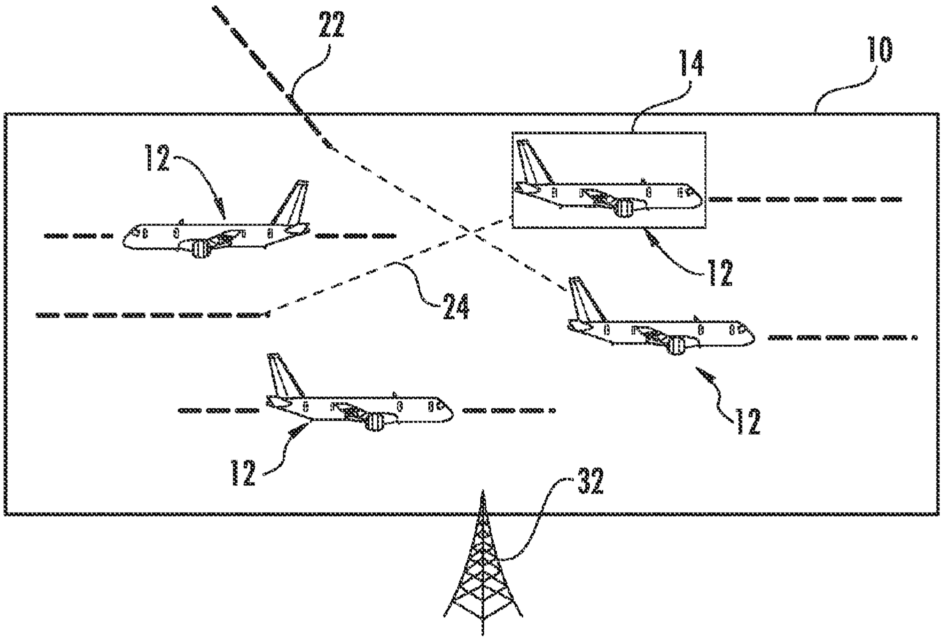
FIG. 2 illustrates another exemplary embodiment in which random time periods are employed for identifier updates.

Referring next to FIG. 2, in another embodiment a method for mitigating location tracking is implemented by using a random time period in the aircraft identifier updates. As discussed above, ADS-B communications are typically broadcast periodically in traffic beacons at a predetermined frequency of about one or two times per second. Using a random time period in the aircraft identifier updates provides spatial and temporal decorrelation of consecutive recorded positions of the updating aircraft, hence potentially mitigating unauthorized tracking of the aircraft. The heavy broken line 22 indicates a flight path or portion thereof, of an aircraft 12, over which an unauthorized entity is tracking location of the aircraft based on wireless communications. A target aircraft 14 in a region 10 has a random time period of silence, indicated by flight path segment 24, during which the unauthorized entity is unable to track location based on wireless communication. The random time period solution enlarges the ADS-B broadcast period, which may reduce the timely availability of aircraft traffic beacons.

Figure 3:
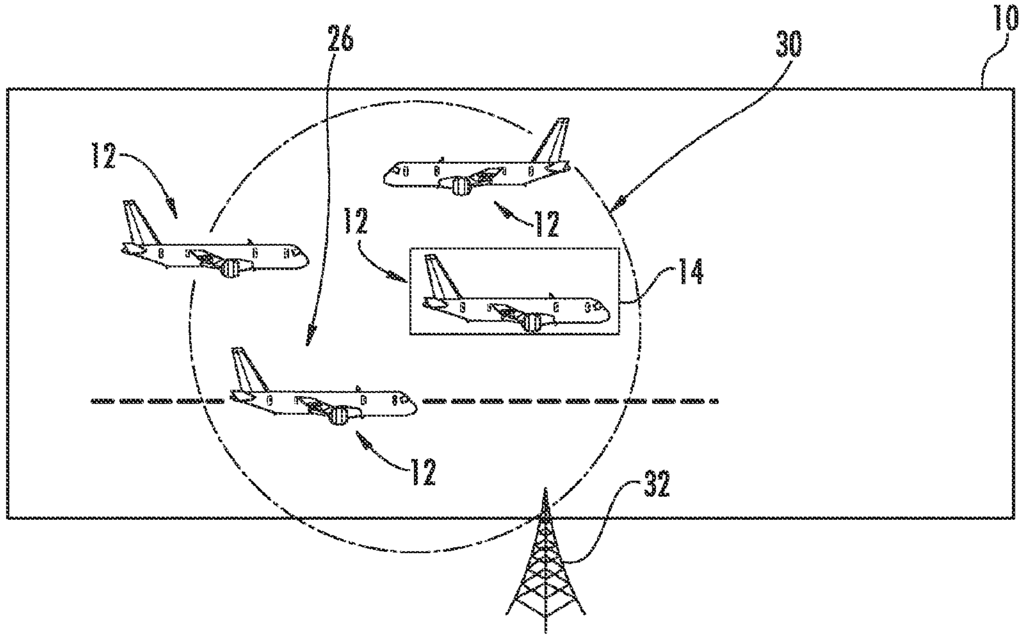
FIG. 3 illustrates a privacy enhancing group for location privacy.

Referring next to FIG. 3, in another embodiment a method is disclosed for mitigation of location tracking using privacy enhancing groups 30. Aircraft 12 navigating as group 30 may be configured to achieve a random time period for identifier update without trading airspace security. Geographically proximate aircraft that are travelling at approximately the same average velocity and in a generally similar direction form a group as they travel, and navigate as a closed network group for at least a portion of their respective flights. Group air travel is described in greater detail in co-pending and commonly-assigned U.S. patent application Ser. No. 12/841,349 entitled Method For Validating Aircraft Traffic Control Data, filed Jul. 22, 2010, incorporated by reference herein. In the exemplary embodiment of FIG. 3, a bounded region 10 is indicated, although group 30 does not require a bounded region 10 for defining group 30 and group 30 may continue indefinitely as a group without regard to bounded region 10.

The group 30 of aircraft may continue to broadcast traffic messages with their respective aircraft identifiers, while cooperating to be represented by a common valid group identifier for most purposes as well as establishing a cryptographic group key for any secret communications within the group. Except for one aircraft of group 30 that is mutually agreed upon by aircraft 12 in group 30 to be the group leader 26, each aircraft 12 then reduces its transmission range to reach only the other group members. In one exemplary embodiment the transmission range may be from 6 to 10 nautical miles (nm) to reach aircraft within a distance of 3 to 5 nm, although the transmission range is not necessarily a limitation of the method and ranges of varying distances may be used as appropriate under the individual circumstances. The group leader, in contrast, has a greater transmission range that is sufficient to reach airborne and ground station equipment, e.g., ADS-B transponders. In one exemplary embodiment the group leader may have a transmission range of about 100 nm. Again, the transmission range of the group leader is not necessarily a limitation of the method and ranges of varying distances may be used as appropriate under the individual circumstances. The group leader may be, e.g., a commercial airliner, since commercial airliner flight paths are generally publicly available and such aircraft do not require location privacy.

In such privacy enhancing groups 30, unauthorized entities outside of the air traffic control system would likely be limited to determining a group's identifier and the associated group leader's location. Each group member 12 can potentially achieve an extended random time period for identifier update, because the group identifier is only traceable to a navigating group 30 of aircraft and because group members 12 can update their identifiers while participating in the group 30. Since a group member is not traceable once it enters a group until it exits a group, the random time period for identifier update equals the duration that the group member remains in the group. Ground stations or controllers 32 are able to identify and accurately trace valid nodes in the sky, while unauthorized entities that wish to eavesdrop may only speculate as to the trajectories of aircraft 12 or airborne nodes.

The level of location privacy provided to a target aircraft by each identifier update may be measured using an anonymity set that includes the target and other nodes with identifiers indistinguishable from that of the target. Assuming that all nodes in the anonymity set are equally likely to be the target, the privacy level is equal to the size of the anonymity set. Entropy, also referred to as information entropy, is a known metric for measuring uncertainty to quantify the privacy level of the anonymity set.

Figure 4A:
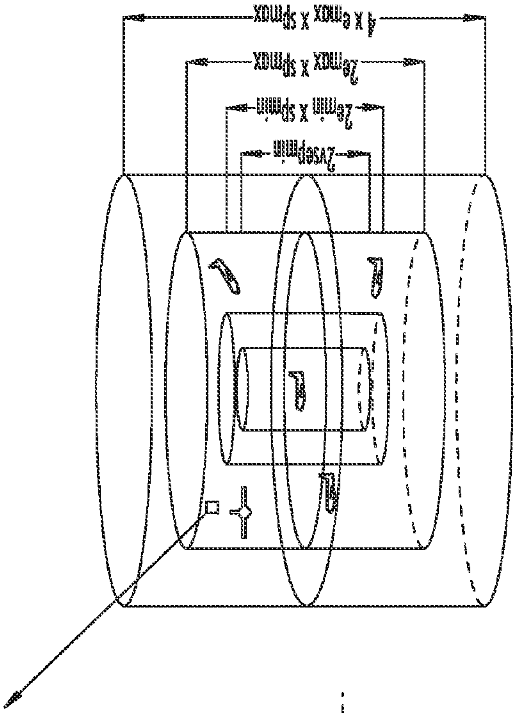
FIG. 4A illustrates an elevational view of the airspace of FIG. 4.
Figure 4:
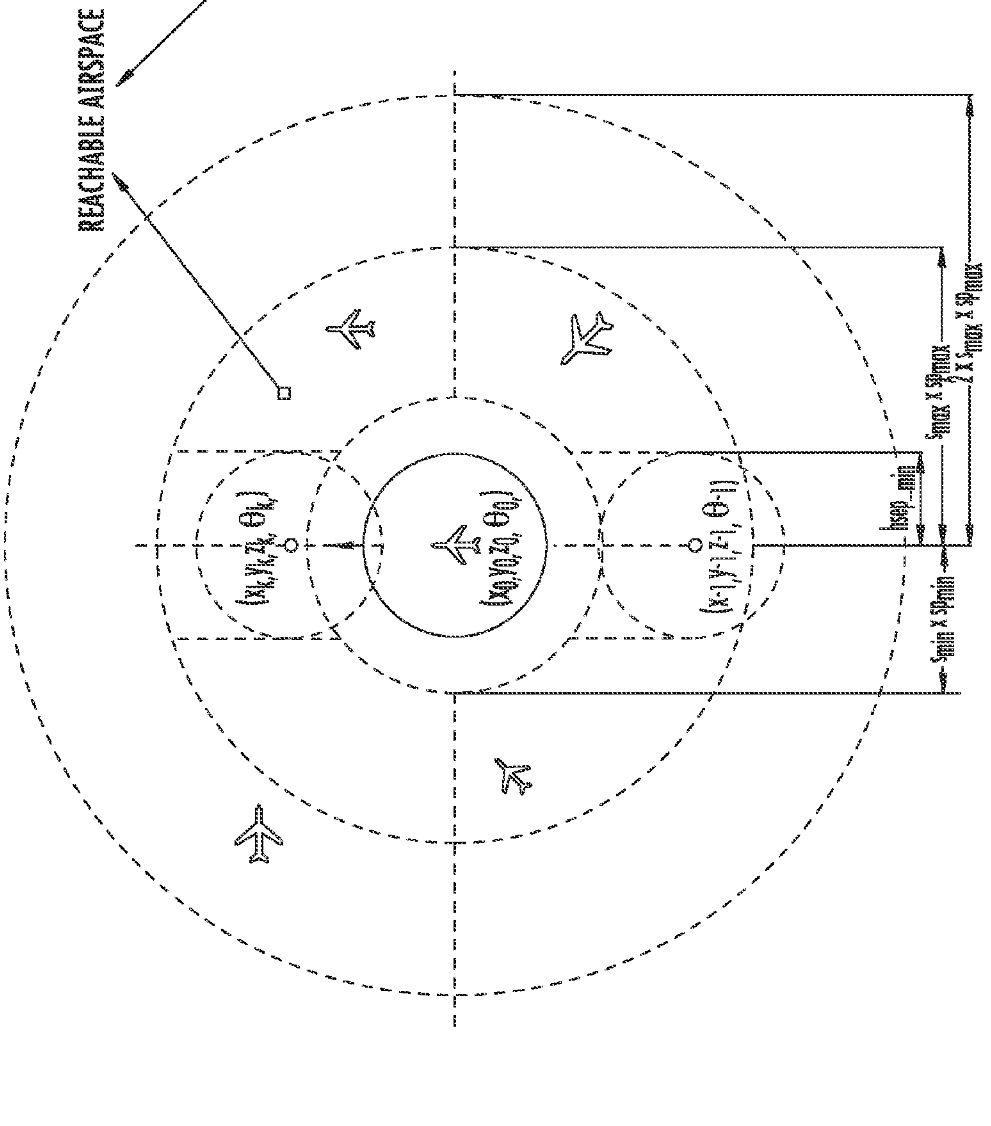
FIG. 4 illustrates a plan view of an airspace for deriving a target aircraft anonymity set.

FIGS. 4 and 4A shows a target that is being tracked and is updating its identifier at location $l_0$ and time $t_0$ using the random silent period mitigation method. The target anonymity set is computed as follows: The reachable area of the target is defined to be the bounded region where the target is expected to reappear after the identifier update. If the target enters a random silent period during the update, the reachable area is then determined by the allowable movement directions, the horizontal and vertical minimum separation, $h_{sepmin}$, $V_{sepmin}$, respectively, the known achievable speed range $[s_{min}, s_{max}]$, elevation range $[e_{min}, e_{max}]$, and the update period which is between a minimum and maximum silent period $[sp_{min}, sp_{max}]$. Note that the reachable area in FIG. 4 is for random node mobility in horizontal as well as vertical directions. The target anonymity set includes nodes that update their identifiers with the target and appear in the reachable area of the target. If all nodes in FIG. 4 update their identifiers with the target and appear in the reachable area after a random silent period, the set will contain all five nodes including the target.

Figure 5:
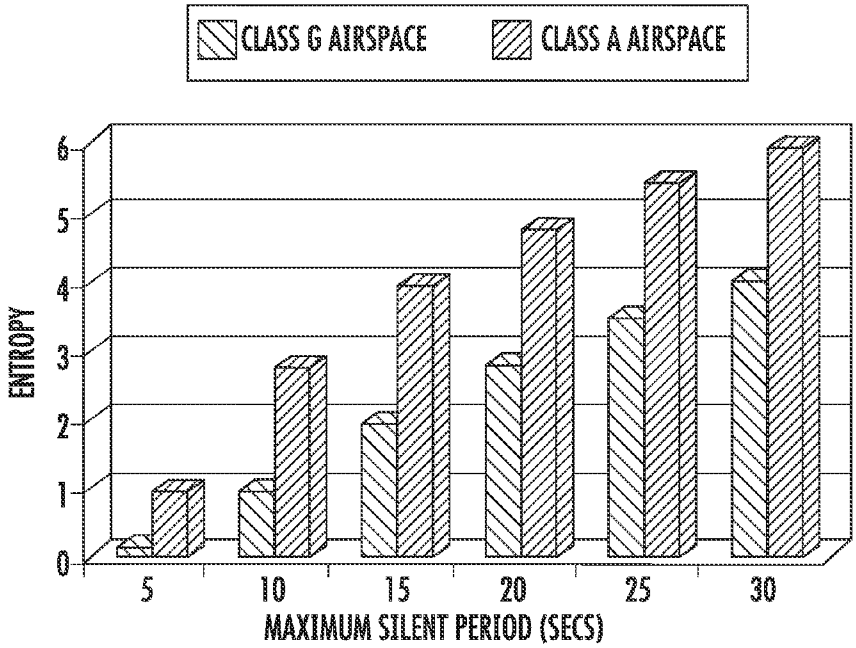
FIG. 5 presents theoretical estimates for the maximum location privacy achievable for a given airspace density.
Figure 5A:
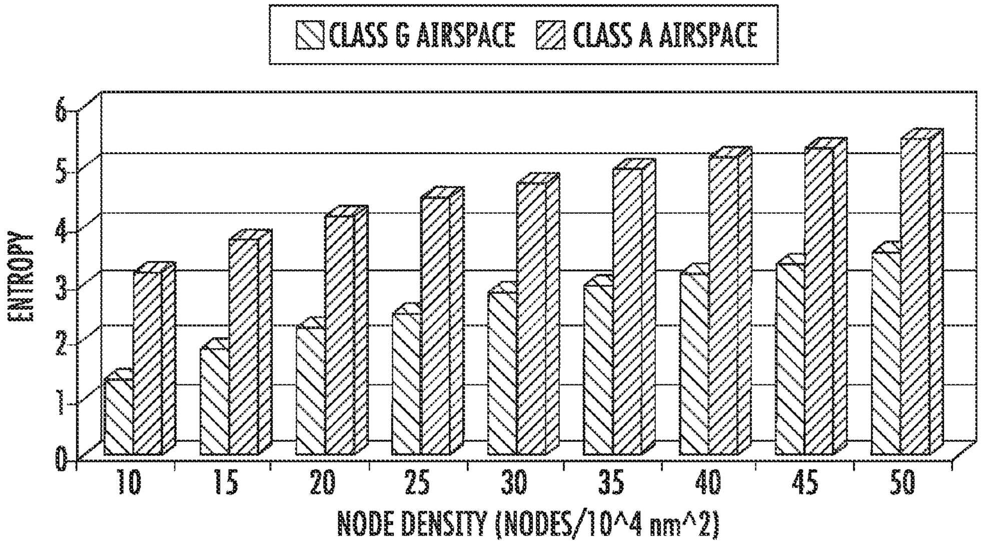
FIG. 5A presents theoretical estimations for the maximum location privacy achievable for a given random silent period.

The location privacy provided by the random silent period solution may be upper bounded for a given node density in airspace. FIG. 5 shows theoretical estimates of the maximum location privacy achievable for target, given airspace density is 30 aircraft per 10,000 square nautical miles ($nm^2$). FIG. 5A shows theoretical estimates of maximum location privacy level for target, given the maximum silent period is 20 secs. Overall, it is demonstrated that the entropy increases with increase in silent period duration as well as node density. For a given node density, it is seen that class A airspace offers a higher entropy because of the higher speeds achievable by aircraft (i.e., average of 900 km/hr), when compared to class G airspace (maximum speed of 460 km/hr). However, given the mobility parameters of the target aircraft remains unchanged during the random silent period the adversary can estimate a location trajectory for the target (e.g., using correlation tracking), thereby assigning non-uniform probabilities for the target anonymity set to reduce uncertainty/entropy.

Figure 6:
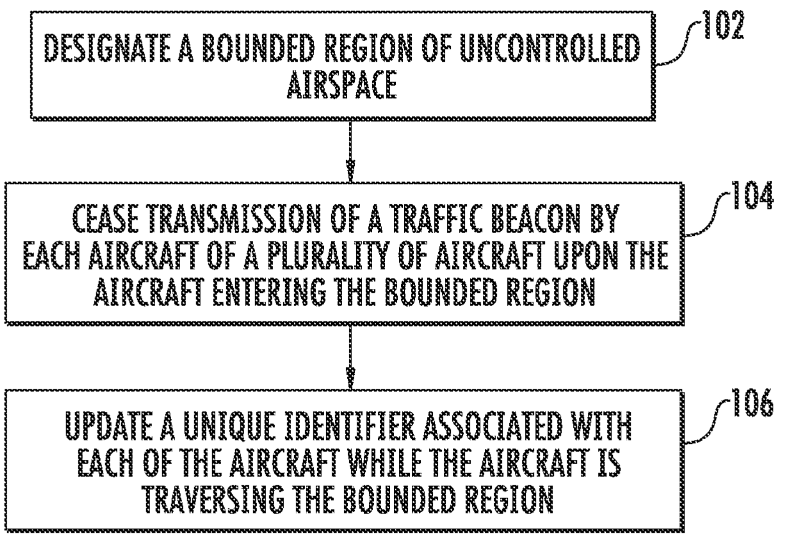
FIG. 6 is a flow chart for one embodiment of the method.

Referring next to FIG. 6, one embodiment of the method is disclosed in a flow chart. At box 102, the system designates a bounded region of uncontrolled airspace. Next, at box 104, each aircraft, upon entering the bounded region, ceases transmission of a traffic beacon and proceeds to box 106. At box 106, each aircraft in the bounded region updates a unique identifier associated with the aircraft while the aircraft is traversing the bounded region.

Figure 7:
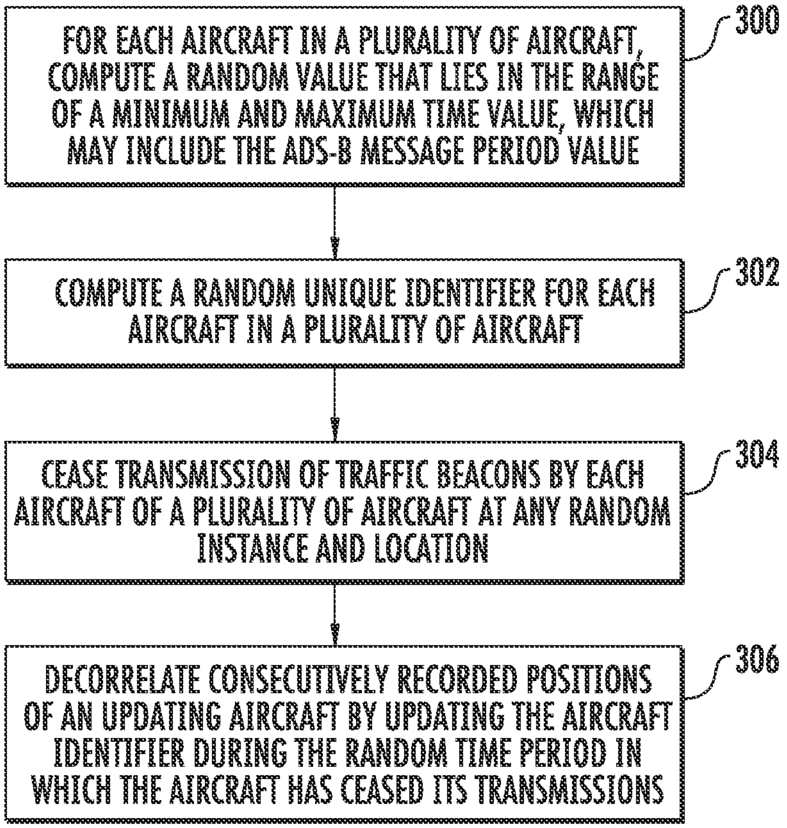
FIG. 7 is a flow chart of another embodiment of the method.

Referring next to FIG. 7, another embodiment of the method is disclosed in a flow chart. At box 300, each aircraft independently computes a random time period. This time period can be the same as the ADS-B message period or any other value that is bounded by a minimum and maximum time period. In box 302, each aircraft independently computes a unique random identifier to update to. Next, at box 304, each aircraft ceases transmission for the independently computed random time period at a random time and location in airspace. Next at box 306, after ceasing transmissions each aircraft updates its unique aircraft identifier to decorrelate consecutively recorded positions of the aircraft.

Figure 8:
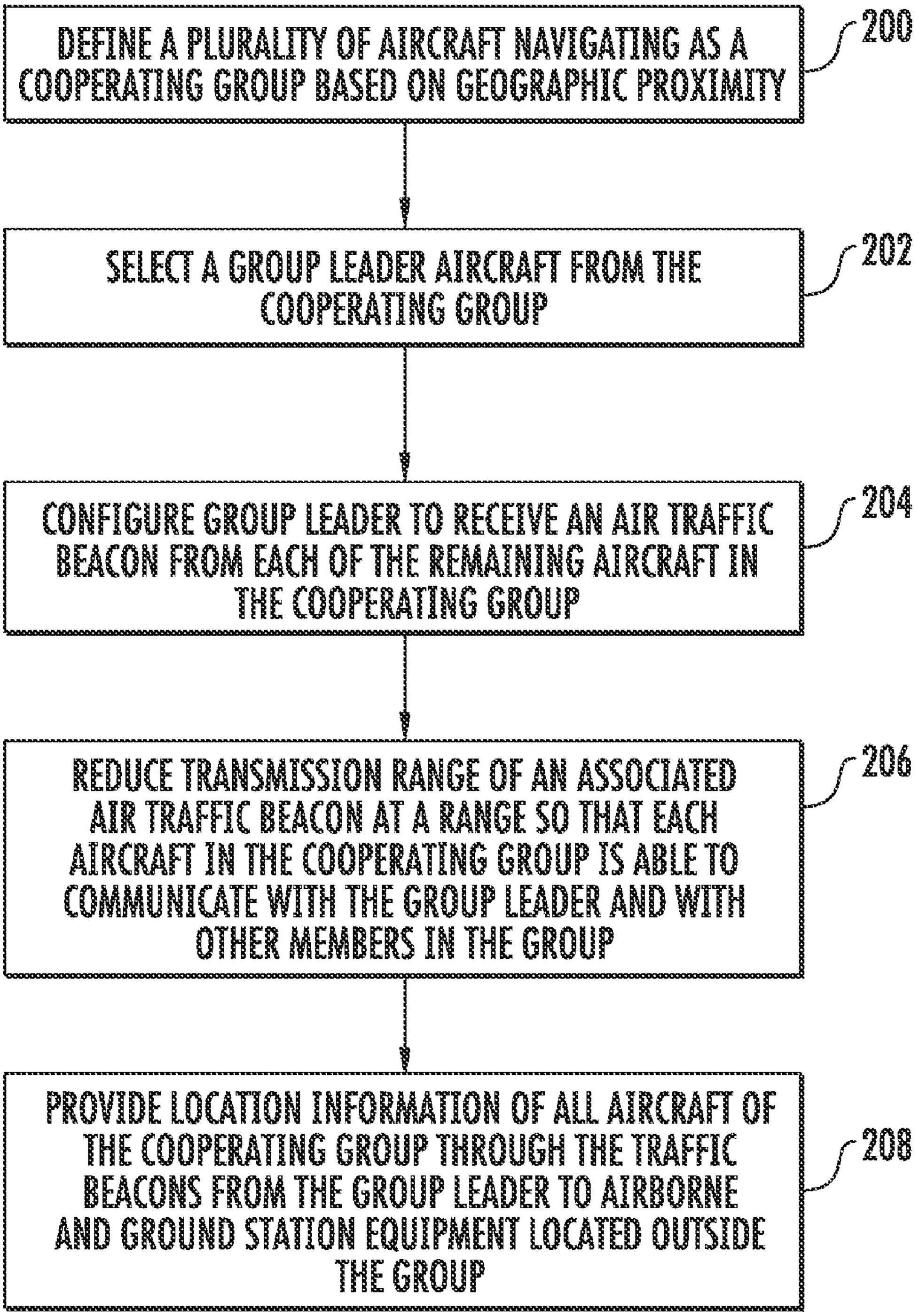
FIG. 8 is a flow chart of an additional embodiment of the method.

Referring next to FIG. 8, another embodiment of the method is disclosed in a flow chart. At step 200, a plurality or group of aircraft navigating is defined or organized as a cooperating group based on geographic proximity. At step 202, the cooperating group of aircraft selects one aircraft of the group to be a group leader. At step 204, the group leader is configured to receive an air traffic beacon from each of the remaining aircraft in the cooperating group. At step 206, each of the aircraft in the cooperating group, with the exception of the group leader, reduce transmission range of its air traffic beacon to a range that is sufficient for each aircraft in the cooperating group is able to communicate with the group leader and other members of the group, while not sufficient to be received by airborne and ground station equipment located outside the group that the aircraft belongs to. At step 208, location information of all aircraft in the cooperating group is provided through a traffic beacon from the group leader to airborne and ground station equipment located outside the group. The group travels concurrently in this manner for at least a portion of the flight paths of the member aircraft.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

Embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

While the disclosure has been described with reference to exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims. It is therefore intended that the following appended claims and claims hereafter introduced are interpreted to include all such modifications, permutations, additions, and sub-combinations as are within their true spirit and scope.

The invention claimed is:

1. A method of protecting location privacy of air traffic communications from unauthorized monitoring of aircraft locations in an uncontrolled airspace comprising:

designating a bounded region of uncontrolled airspace;

ceasing transmission of a traffic beacon by each aircraft of a plurality of aircraft upon the aircraft entering the bounded region;

updating a unique identifier associated with each of the aircraft while the aircraft is traversing the bounded region.

2. The method of claim 1, wherein for a target aircraft selected from the plurality of aircraft, the target aircraft traversing the bounded region, a point of entry of the bounded region by the target aircraft is untraceable by an unauthorized entity to an exit point of the bounded region by the target aircraft when at least two aircraft are simultaneously traversing the bounded region.

3. The method of claim 1, wherein there is low degree of temporal and spatial correlation between the at least two simultaneously traversing aircraft.

4. The method of claim 1, wherein a time and an exit point that each aircraft would exit the bounded region is less predictable for an entity attempting to track one or more of the aircraft.

5. The method of claim 1, wherein the bounded region comprises a plurality of navigating aircraft traversing the bounded region.

6. The method of claim 1, wherein the step of updating a unique identifier associated with each of the aircraft while the aircraft is traversing the bounded region occurs at a predetermined frequency.

7. The method of claim 1, wherein the step of updating a unique identifier associated with each of the aircraft while the aircraft is traversing the bounded region occurs at a random time period.

8. A method of protecting location privacy of air traffic communications from unauthorized monitoring of aircraft locations in an uncontrolled airspace comprising:

computing a random time period from a bounded range of values;

ceasing transmission of a traffic beacon by each aircraft of a plurality of aircraft at a random time instance and random location;

updating a unique identifier associated with each of the aircraft while the aircraft is not transmitting during the chosen random time period.

9. The method of claim 8, wherein updating the aircraft identifier at random time periods provides spatial and temporal decorrelation of consecutive recorded positions of the updating aircraft.

10. A method for mitigating location tracking and enhancing aircraft location privacy comprising:

defining a plurality of aircraft navigating as a cooperating group, wherein each aircraft of the cooperating group is geographically proximate to the remaining aircraft in the group, and wherein each aircraft of the cooperating group is travelling at approximately the same average velocity and in a generally similar direction;

selecting a group leader aircraft from the cooperating group of aircraft, the group leader aircraft configured to receive an air traffic beacon from each of the remaining aircraft of the cooperating group;

reducing a transmission range of an associated air traffic beacon by each of the remaining aircraft of the cooperating group, the reduced transmission range sufficient for each of the aircraft to communicate with the group leader and with the remaining aircraft; and providing location information of all aircraft in the cooperating group to the airborne and ground station equipment outside the cooperating group, through the traffic beacons from the group leader.

11. The method of claim 10, further comprising:

designating a bounded region of uncontrolled airspace;

ceasing transmission of a traffic beacon by each aircraft of the cooperating group upon the aircraft entering the bounded region;

updating a unique identifier associated with each of the aircraft while the aircraft is traversing the bounded region.

12. The method of claim 10, further comprising updating the aircraft identifier at random time periods.

13. The method of claim 10, further comprising updating the aircraft identifier at a predetermined frequency.

14. The method of claim 10, wherein the transmission range may be from 3 to 5 nautical miles (nm).

15. The method of claim 10, wherein the transmission range may be greater than 5 nautical miles.

16. The method of claim 10, further comprising providing the group leader with a second transmission range greater than the reduced transmission range of the remaining aircraft of the group, the second transmission range sufficient to reach airborne and ground transponders.

17. The method of claim 16, wherein the group leader transmission range is about 100 nautical miles.

18. The method of claim 10, further comprising:

navigating cooperatively with the cooperating group for at least a portion of each aircraft's respective flights in the cooperating group.

19. The method of claim 10, wherein the group leader may be a commercial airliner.

20. A system for mitigating location tracking and enhancing aircraft location privacy comprising:

a plurality of aircraft navigating as a cooperating group, each aircraft of the cooperating group being geographically proximate to the remaining aircraft in the group; each aircraft of the cooperating group travelling at approximately the same average velocity and in a generally similar direction;

each aircraft including an ADS-B type air traffic communication system, and each aircraft configured to:

select a group leader aircraft from the cooperating group of aircraft;

reduce a transmission range of an associated air traffic beacon by each of the remaining aircraft of the cooperating group, the reduced transmission range sufficient for each of the aircraft to communicate with the group leader and the remaining aircraft of the cooperating group; and provide location information for all aircraft of the cooperating group to the group leader;

the group leader aircraft configured to receive an air traffic beacon from each of the remaining aircraft of the cooperating group and to communicate its own traffic beacons with airborne and ground station equipment located outside the group.

* * * * *